United States Patent
Hakkani-Tur et al.

(10) Patent No.: US 9,607,046 B2
(45) Date of Patent: Mar. 28, 2017

(54) PROBABILITY-BASED STATE MODIFICATION FOR QUERY DIALOGUES

(71) Applicant: Microsoft Technology Licensing, LLC, Redmond, WA (US)

(72) Inventors: Dilek Hakkani-Tur, Los Altos, CA (US); Gokhan Tur, Los Altos, CA (US); Larry Heck, Los Altos, CA (US); Ashley Fidler, San Jose, CA (US); Fehtiye Asli Celikyilmaz, Mountainview, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 735 days.

(21) Appl. No.: 13/715,060

(22) Filed: Dec. 14, 2012

(65) Prior Publication Data

US 2014/0172899 A1 Jun. 19, 2014

(51) Int. Cl.
G06F 17/30 (2006.01)

(52) U.S. Cl.
CPC .......................... G06F 17/30522 (2013.01)

(58) Field of Classification Search
CPC ................................................. G06F 17/30522
USPC ................................ 707/758, 759, 769, 770
See application file for complete search history.

(56) References Cited

U.S. PATENT DOCUMENTS

| | | | |
|---|---|---|---|
| 7,016,849 B2 | 3/2006 | Arnold | |
| 7,197,460 B1 | 3/2007 | Gupta | |
| 7,263,489 B2 | 8/2007 | Cohen | |
| 7,580,842 B1 | 8/2009 | Bangalore | |
| 2006/0074670 A1 | 4/2006 | Weng | |
| 2009/0043748 A1* | 2/2009 | Maghoul et al. | 707/5 |
| 2012/0150850 A1* | 6/2012 | Parthasarathy et al. | 707/728 |
| 2013/0290342 A1* | 10/2013 | Cooper et al. | 707/740 |

OTHER PUBLICATIONS

Xiao Li et al., Learning query intent from regularized click graphs, Jul. 2008, ACM, 339-346.*
Juang, et al., "Minimum Classification Error Rate Methods for Speech Recognition"—Published Date: May 1997, Proceedings: IEEE Transactions on Speech and Audio Processing, pp. 257-265 http://ieeexplore.ieee.org/stamp/stamp.jsp?tp=&arnumber=568732.

(Continued)

*Primary Examiner* — Jean B Fleurantin

(57) ABSTRACT

A device may facilitate a query dialog involving queries that successively modify a query state. However, fulfilling such queries in the context of possible query domains, query intents, and contextual meanings of query terms may be difficult. Presented herein are techniques for modifying a query state in view of a query by utilizing a set of query state modifications, each representing a modification of the query state possibly intended by the user while formulating the query (e.g., adding, substituting, or removing query terms; changing the query domain or query intent; and navigating within a hierarchy of saved query states). Upon receiving a query, an embodiment may calculate the probability of the query connoting each query state modification (e.g., using a Bayesian classifier), and parsing the query according to a query state modification having a high probability (e.g., mapping respective query terms to query slots within the current query intent).

20 Claims, 8 Drawing Sheets

(56) References Cited

OTHER PUBLICATIONS

Carlson, et al., "Data Analysis Project: Leveraging Massive Textual Corpora Using n-Gram Statistics"—Published Date: May 2008, pp. 31 Pages, http://reports-archive.adm.cs.cmu.edu/anon/anon/usr0/ftp/ml2008/CMU-ML-08-107.pdf.
Miller, et al., "A Fully Statistical Approach to Natural Language Interfaces"—Published Date: Jun. 24, 1996 Proceedings: In Proceedings of the 34th Annual Meeting on Association for Computational Linguistics, pp. 7 http://acl.ldc.upenn.edu/P/P96/P96-1008.pdf.
Levin, et al., "A Stochastic Model of Computer-Human Interaction for Learning Dialogue Strategies"—Published Date: Sep. 22, 1997, Proceedings: In Proceedings of Eurospeech, pp. 4, http://people.ict.usc.edu/~traum/cs599s04/levin97stochastic.pdf.
Williams, et al., "Scaling Up POMDPs for Dialog Management: The "Summary POMDP" Method"—Published Date: Nov. 27, 2005, Proceedings: In IEEE Workshop on Automatic Speech Recognition and Understanding, pp. 6 http://ieeexplore.ieee.org/stamp/stamp.jsp?tp=&arnumber=1566498.
Traum, et al., "The Information State Approach to Dialogue Management"—Published Date: Nov. 30, 2003 Proceedings: In Current and New Directions in Discourse & Dialogue, vol. 22, pp. 30 http://people.ict.usc.edu/~traum/Papers/traumlarsson.pdf.
Hakkani-Tur, et al., "Exploiting Query Click Logs for Utterance Domain Detection in Spoken Language Understanding"—Published Date: May 22, 2011, Proceedings: In IEEE International Conference on Acoustics, Speech, and Signal Processing, pp. 4, http://research.microsoft.com/en-us/people/gokhant/icassp11-2.pdf.
Favre, et al., "Icsiboost"—Retrieved Date: Jun. 20, 2012, pp. 2, http://code.google.com/p/icsiboost/.
Schapire, et al., "BoosTexter: A Boosting-based System for Text Categorization"—Published Date: May 2000, Proceedings: In Machine Learning, vol. 39, No. 2-3, pp. 34, http://www.stttelkom.ac.id/staf/apk/riset/2011/text%20preprocessing/paper/BoosTexter-A%20Boosting-based%20System%20for%20Text%20Categorization.pdf.
Hakkani-Tur, et al., "A Discriminative Classification-Based Approach to Information State Updates for a Multi-Domain Dialog System", pp. 4, Published: Sep. 2012, Publisher: Annual Conference of the International Speech Communication Association (Interspeech), http://research.microsoft.com/pubs/172313/IS12-2.pdf.
Tur, et al., "Towards unsupervised spoken language understanding: Exploiting query click logs for slot filling," in Proceedings of Interspeech, 2011, Aug. 28-31, 2011, pp. 1293-1296, http://research.microsoft.com/pubs/172322/Gokhan-IS11.pdf.
Crook, et al., "Lossless value directed compression of complex user goal states for statistical spoken dialogue systems," Published in Proceedings of the 12thAnnual Conference of the International Speech Communication Association (Interspeech 2011), Aug. 2011, pp. 4, https://docs.google.com/viewer?a=v&pid=sites&srcid=ZGVmYXVsdGRvbWFpbnxwYWNyb29rfGd4OjFmMjk3ZmF-kMjU2MGViMGI.

* cited by examiner

PROBABILITY-BASED STATE MODIFICATION FOR QUERY DIALOGUES

BACKGROUND

Within the field of computing, many scenarios involve a query received from a user, such as a web search query, a database query, and an informational query presented to an informational agent. Such queries may involve a comparison of a set of keywords identified in the query with the identifiers of associated items, such as words appearing in respective indexed web pages. Informational queries may also involve a request specified by the user, such as a request to send information to another individual or to complete a transaction (e.g., purchasing a ticket to a movie). A device may apply a query processing technique to identify the contents of the query, to execute a search or request on behalf of the user, and to present results to the user.

Many such scenarios may enable a user to modify a query in order to view different results or to specify a different request. To this end, query processing techniques may involve modifying a first query according to a second query. For example, a user may specify a first query as a set of keywords, and may then specify a second query requesting an addition, removal, and/or substitution of keywords in the first query, as well as starting a fresh new search. The device may modify the first query according to the second query and may present an updated result set. A series of such query state modifications may enable a dialog between the user and the device, such as an incremental and iterative refinement of a search or user request in order to fulfill the intent of the user.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Many techniques may be applied to the parsing of queries. In some such techniques, the query may involve processing a first query to identify a query state, such as the user state or the dialog state, and then updating the query state in view of the contents of a second query. While a keyword-based approach may be suitable for generalized scenarios (e.g., web searches comprising a set of keywords), other queries may present specialized information or requests within a particular query domain that are difficult to identify through generalized matching, but that may be identified through the context of the query domain. For example, for a query such as "flight Paris London," a generalized evaluation (such as a general web search) may turn up many references including these keywords, including the distance and typical time involved in such a flight, or historical information about the first commercial flight in 1919 that connected these cities. However, a specialized evaluation within the query domain of a flight booking service may identify the query as a request for information about imminent flights between these cities. Moreover, this query domain may provide contextual indicators (such as the ordering of the cities as probably indicating, respectively, the points of departure and arrival) and may serve to identify missing or ambiguous information (such as the date of interest to the user), which may be useful in identifying the interests of the user. However, the particular manner of using the identification of query domains to facilitate the parsing of a query, and particularly of a query requesting a modification of a query state in a query dialogue, in view of several query domains and a significant set of query state modifications that a query may represent.

Presented herein are techniques for evaluating a query to identify a query state modification of a query state. In accordance with these techniques, a device may identify a set of query state modifications that a query may represent, such as an addition, removal, or substitution of a query term; a specification or change of an intent requested within the query domain (e.g., searching for flights within the query domain of a commercial flight service, vs. requesting a purchasing of a flight); specifying or changing to a different query domain (e.g., while planning a vacation, a user may first search for events in a particular city, and then switch to querying the upcoming weather in the city), navigating within a series of query states (e.g., saving a query state or returning to an earlier query state). Upon receiving a query while in a query state, the device may compare the probabilities of respective query state modifications (e.g., using a Bayesian classifier trained to recognize query state modifications within a particular query domain), and may select the query state modification having a high probability, along with any query terms identified in the query, to determine how the user wishes to modify the current query state. By repeatedly performing this evaluative process, the device may enable a query dialogue, potentially spanning several query domains and intents, and a flexible query state navigation that provides a more natural conversational interaction with the user.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
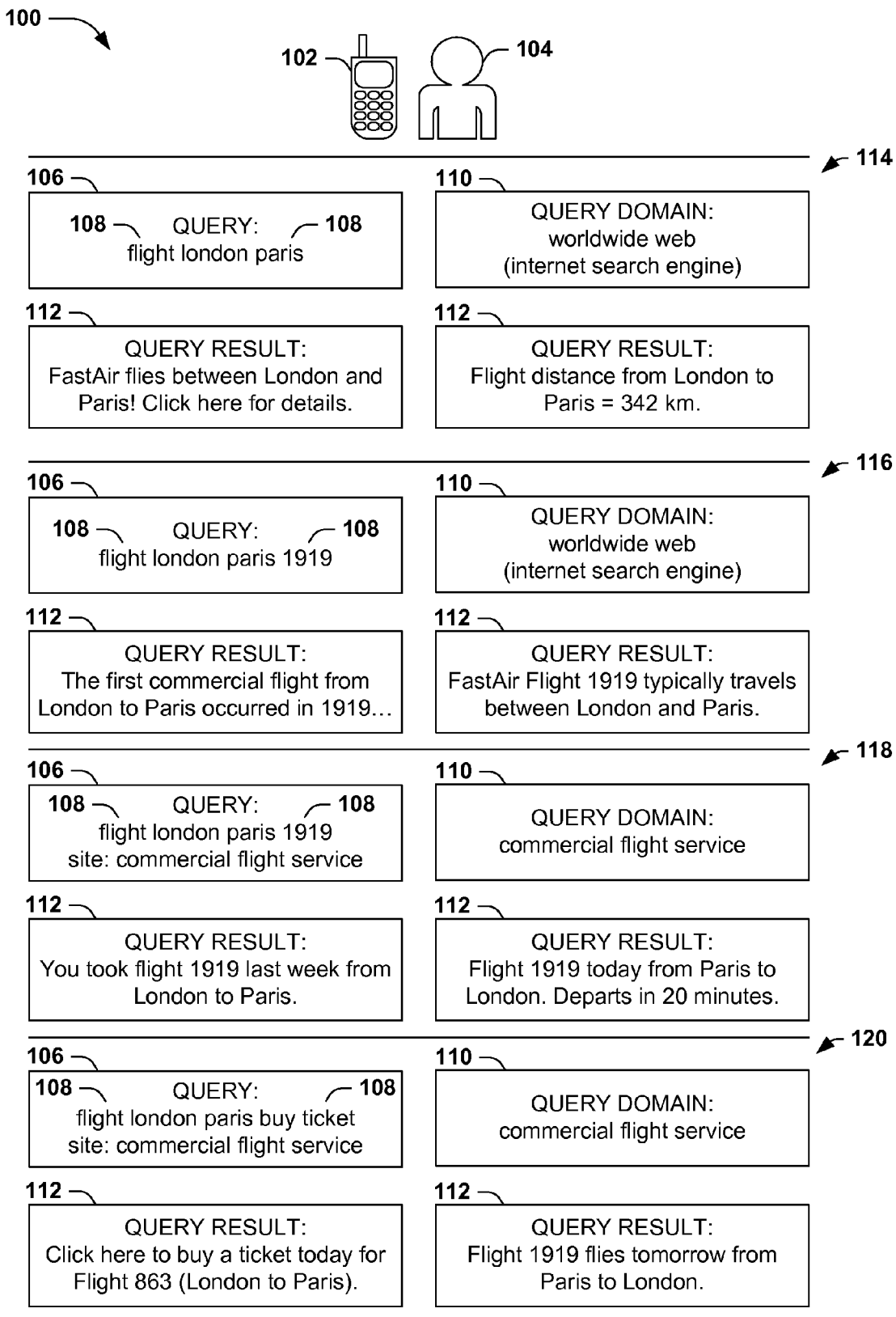
FIG. 1 is an illustration of an exemplary scenario featuring a query dialogue presented as a set of queries involving a query domain.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve the fulfillment of a query. Such queries are often received from a user through one or a query modality (e.g., text entry, touch, voice, or gesture), and are processed against a data set, such as a generalized search engine indexing a set of content (e.g., a web search engine indexing the Worldwide Web, or a file system indexing a set of files) or a specialized search engine providing access to structured data (e.g., a database search engine configured to identify and return records matching a set of criteria). Moreover, some queries may request information, while others may request the completion of a transaction, such as initiating a request with a service, applying a transformation to a particular type of data, or completing a financial transaction, such as the purchase of a product from an e-commerce site.

In many such scenarios, the user may present a set of interrelated queries that together express the intent of the user. As a first example, the user may initiate several searches for different types of data related to the same topic of interest (e.g., while planning travel, a user may request information about available flights, available hotels, and weather reports for one or more destinations). As a second example, the user may incrementally refine a query in order to hone in on a particular type of sought information or to specify a request with sufficient accuracy. As a third example, the user may submit a first query with an initial intent (e.g., searching for available flights), but after a shift in the user's intent, the user may submit a second query with a different intent (e.g., purchasing a ticket on an available flight).

In these and other scenarios, a device (such as a computer) may be configured to evaluate the user's queries; to identify explicit or implicit information about the domain of the query, the intent of the query within the domain, and the details specified in the query as query terms. The device may endeavor to fulfill the user's query in view of a query state, such as a context of the query identified through the evaluation of previous queries. The device may also be configured to receive and apply requests by the user for modifying the query state, such as by further restricting the query state; changing the intention of the query state; changing the domain of the query state; or returning to a former query state. However, it may be difficult to configure the device to understand and accurately fulfill such requests in view of a complex set of query domains, query intents, query terms of the current query, and the set of current and former query states. Moreover, it may be difficult to enable the user to specify any such transition in the query session through the use of natural-language input, such as spoken commands spoken by the user in a natural-language, conversational manner of speech, supplemented by other input modalities such as touch input and gestures. The proficiency of the query processing techniques may significantly affect the interpretation and adequate fulfillment of the user's query.

FIG. 1 presents an illustration of an exemplary scenario 100 featuring a device 102 configured to receive and fulfill queries 106 received from a user 104. Such queries 104 may comprise a set of query terms 108, such as keywords provided in a text input interface, which may be evaluated by a query processor to generate a set of query results 112.

As further illustrated in this exemplary scenario 100, the user 104 seeks to find and purchase an airplane ticket on Flight 1919 from London to Paris. At a first time point 114, the user 104 may begin by submitting a query 106 comprising the query terms "flight london paris." Because the user 104 has not specified a query domain 110 (e.g., a particular service, website, or data source to which the query 106 is to be applied), the device 102 may process the query 106 in a generalized query domain 110 (e.g., a generalized internet search engine), and may produce query results 112 generally relating to flights between London and Paris, such as an advertisement for an airline providing such flights and information about such flights, such as the total distance. While fully matching the query terms 108, these query results 112 are not relevant to the intent of the user 104, who may seek more relevant results by adding further query terms 108.

At a second time point 116, the user 104 may submit a second query 106 including as a query term 108 the number of the flight desired (flight 1919). The device 102 may again apply the query 106 to a generalized query domain 110, resulting in information about the first commercial flight between the cities in the year 1919, and information about the existence of the route between the cities. While matching the query terms 108 specified by the user 104, these query results 112 are not relevant to the intent of the user 104 in finding and purchasing a ticket on a specific occurrence of flight 1919, and so the user 104 may further refine the query 106 by identifying a commercial flight service to which the query 106 is to be submitted.

At a third time point 118, the user 104 may submit a third query 106 featuring the same query terms 108 ("flight london paris 1919"), but further refined by specifying a commercial flight service as the query domain 110. The device 102 may apply the query 106 to the specified query domain 110 and return query results 112 matching these query terms 108, such as information about a trip on flight 1919 between Paris and London completed by the user 104 during the preceding week, and information about an imminent departure of flight 1919 from Paris to London. While closer to the intent of the user 104, these results are still not related to the interest of the user 104 in acquiring a ticket from an imminent flight, and the user 104 may add query terms 108 further clarifying this intent.

At a fourth time point 120, the user 104 may add query terms 108 to the query 106 that solicit information about purchasing a ticket (e.g., "flight london paris buy ticket"). However, the user 104 may inadvertently admit flight number 1919 from this query 106, and the query results 112 may thus relate to other flights between Paris and London, and also about instances of flight 1919 that may not be of interest to the user 104 (e.g., the occurrence of flight 1919 tomorrow from Paris to London). The user 104 may continue by incrementally refining and resubmitting the query 106 until adequate query results 112 are returned.

While the exemplary scenario 100 presents query results 112 pertinent to each query 106 submitted by the user 104, it may be appreciated that several disadvantages arise from this iterative refinement. As a first example, although the general topic sought by the user 104 may be apparent from each query 106, a query domain 110 specialized for that topic is only used when specifically identified and requested by the user 104. If the user 104 does not now or identify the query domain 110, generalized query domains 110 are used that provide unspecialized query results 112. As a second example, the intent of the user 104 is not identified or used to refine the query, and keywords identifying the intent of the query 104 are treated the same as other keywords. For example, in the fourth query 106, the intent of the user 104 to purchase a ticket for a flight is apparent, but the highly significant term "buy" is lost among the other terms, and several of the query result 112 may fail to relate to tickets that may be purchased. As a third example, information is not persisted from one query 106 to the next; the user 104 has to keep adding onto the query 104, leading to a jumble of query terms 108. As a fourth example, because the query 106 is evaluated as a generalized set of query terms 108 even when a select query domain 110 is specified, contextual cues may be lost during the parsing. For example, a query 106 specifying "flight london paris" presents an order connoting a refinement of the query 106—i.e., flights from London to Paris—but this contextual information may not be identified or utilized, thus resulting in less relevant query results 112 about flights from Paris to London.

Figure 2:
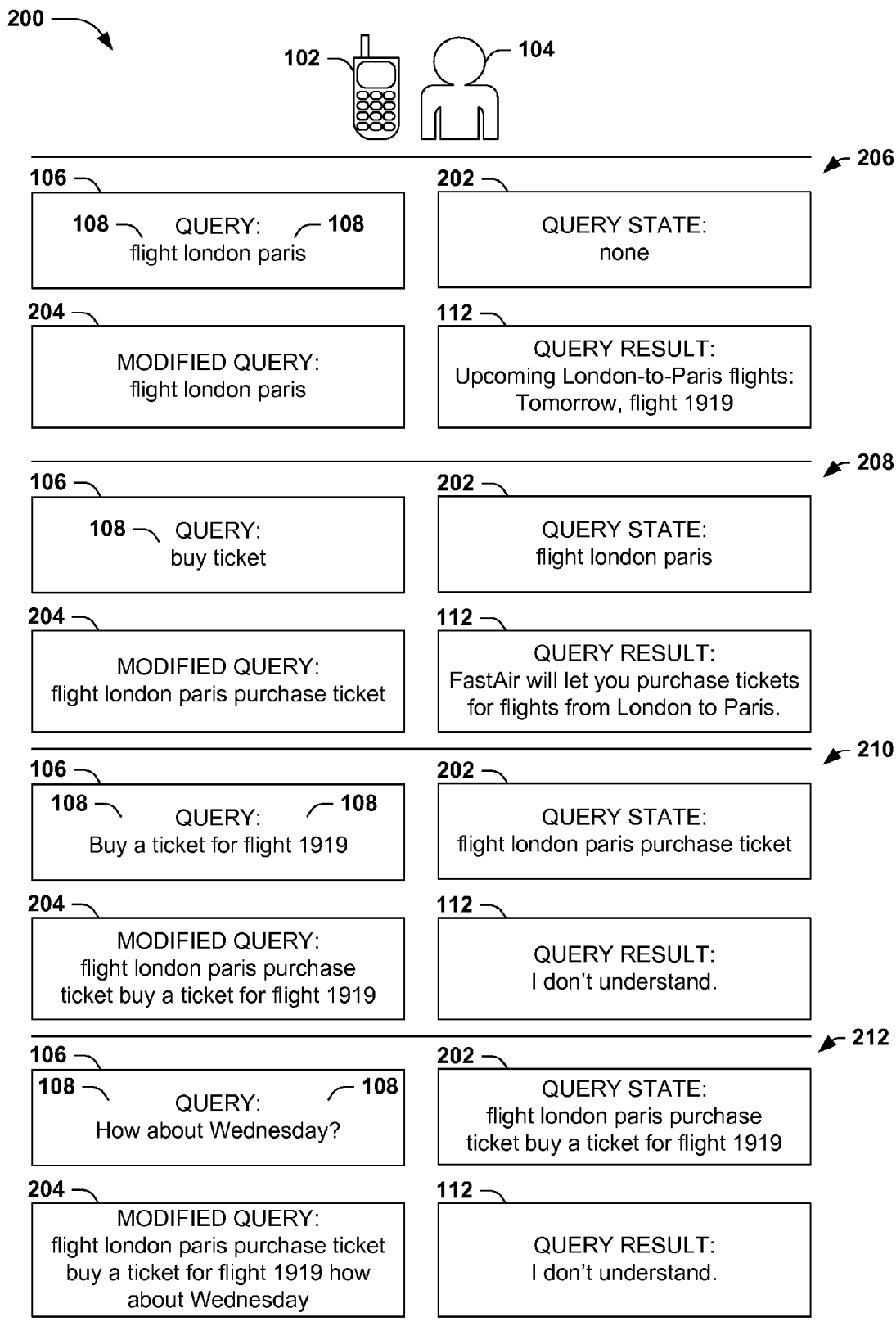
FIG. 2 is an illustration of an exemplary scenario featuring a query dialogue presented as a sequence of query modifications.

FIG. 2 presents a second illustration of the fulfillment of queries 106 on behalf of a user 104, illustrated as a second exemplary scenario 200 wherein a sequence of queries 106 is evaluated to produce query results 112. Again, in this exemplary scenario 200, the user 104 seeks to find and purchase a ticket on flight 1919 from London to Paris through the submission of a sequence of queries 106. This exemplary scenario 200 extends the sophistication of the exemplary scenario 100 of FIG. 1 by storing a query state 202 among queries 106 in a sequence, thus enabling a persistence of contextual information that may lead to more relevant query results 112.

At a first time point 206, the user 104 submits a first query 106 providing the query terms 108 "flight london paris." The device 102 may begin with a query state 202 that is initially empty, and may combine the query state 202 and the query 106 to produce a modified query 204 that is evaluated to produce a query result 112 revealing an upcoming occurrence of flight 1919 from London to Paris.

At a second time point 208, the user 104 may submit a second query 106 with the query terms 108 "buy ticket," indicating the intent of the user 104 to buy a ticket on this flight. However, while the query state 202 has persisted information about the previous query 106 submitted by the user, the query state 202 does not include information about the previous query result 112. Thus, combining the query state 202 "flight london paris" with the query terms 108 "buy ticket" results in a modified query 204 indicating a generalized interest in purchasing a flight ticket between London and Paris, and producing a query result 112 featuring an advertisement for an airline offering such tickets.

At a third time point 210, the user 104 may submit a third query 106 that explicitly specifies the information from the previous query result 112 regarding the flight to be purchased. However, the device 102 may not recognize that this information is presented to alter the intent of the query 202, but may simply regard the query terms 108 as supplemental to the query state 202. The addition of the query terms 108 to the query state 202 leads to a modified query 204 comprising an extended jumble of query terms 106 ("flight london paris purchase ticket buy a ticket for flight 1919") that the device 102 cannot meaningfully process, leading to a query result 112 indicating an inability to process the query.

At a fourth time point 212, the user 104 may submit a fourth query 106 attempting to clarify the previous query 106 by replacing a query term 108 with a different query term 108. Additionally, the user 104 may specify the fourth query 106 in a natural-language manner, rather than as a set of keywords. However, the device 102 may not be able to recognize the meaning of the natural-language input or the modification of the query state 202 requested by the query 106, and may again append the query terms 108 to the query state 202 resulting in a modified query 204 that, again, the device 102 is unable to process.

While the exemplary scenario 200 of FIG. 2 presents some techniques for enhancing the sophistication of query processing by persisting the query state 202, some disadvantages may be appreciated to exist in both scenarios. As a first such example, in both scenarios, the parsing technique does not attempt to infer a query domain 110 of a query 106 unless explicitly specified by the user 104. As a second such example, in both scenarios, the parsing technique does not attempt to infer any type of intent by the user 104 in formulating the query 106; rather, each query 106 is treated as a collection of keywords to be presented to a query domain 110. For example, a query 106 may be submitted with the intent of requesting information, of providing information, or of initiating a particular type of request or transaction relevant to a particular query domain 110, but the query processing techniques make no attempt to deduce such intents nor to adjust or apply the query 106 in furtherance of the intent. As a third example, neither parsing technique attempts to evaluate how a later query 106 may be formulated to affect an earlier query 106 or query state 202. For example, a later query 106 may be submitted to replace or remove query terms 108 in an earlier query 106; to apply the earlier query 106 to a different query domain 110 or with a different query intent; to refer to a query result 112 presented in response to an earlier query 106; or to return to a previous query 106. However, the parsing technique in the exemplary scenario 100 of FIG. 1 does not persist any information from one query 106 to the next, and the parsing technique in the exemplary scenario 200 of FIG. 2 simply aggregates the query terms 108 of a current query 106 with a current query state 202 to generate the modified query 204. As a fourth example, neither parsing technique is configured to parse natural-language input queries; rather, as illustrated in the parsing of the fourth query 106, the parsing technique in the illustrated scenario 200 of FIG. 2 regards the natural-language spoken input as a set of query terms 108 equivalent with the query terms 108 of prior, non-natural-language queries 106. In these and other ways, the parsing techniques presented in FIGS. 1-2 illustrate various capability limitations that may be addressed by other parsing techniques.

B. Presented Techniques

Presented herein are techniques for evaluating queries 106 that may enable a more natural query dialogue with the user 104. In accordance with these techniques, the device 102 may define a set of query state modifications that a user 104 may submit in order to modify a current query state 202 in the resubmission of a query 202. For example, the query state modifications may include, e.g., an addition of query terms 108 to the query state 202; a substitution of query terms 108 in the query 106 for the query terms 108 of the query state 202; a removal of query terms 108 from the query state 202; a change of query domain 110 (such that the query terms 108 of the query state 202 are submitted to the new query domain 110); a change of query intent within a selected query state 202 (e.g., transitioning from queries 106 requesting information on flights within a commercial flight service, to queries 106 initiating a purchase transaction within the commercial flight service); and a navigation within a history of query states 202. Additionally, the device 102 may include a classifier that is capable of calculating the probability that a query 106 is requesting a modification of a query state 202 according to a particular query state modification. The probability predictions of respective query state modifications for a particular query 106 may be used to infer the intent of the user 104 in formulating and submitting the query 106, and may provide opportunities for the inclusion of additional features that enhance the query dialogue between the user 104 and the device 102.

Figure 3:
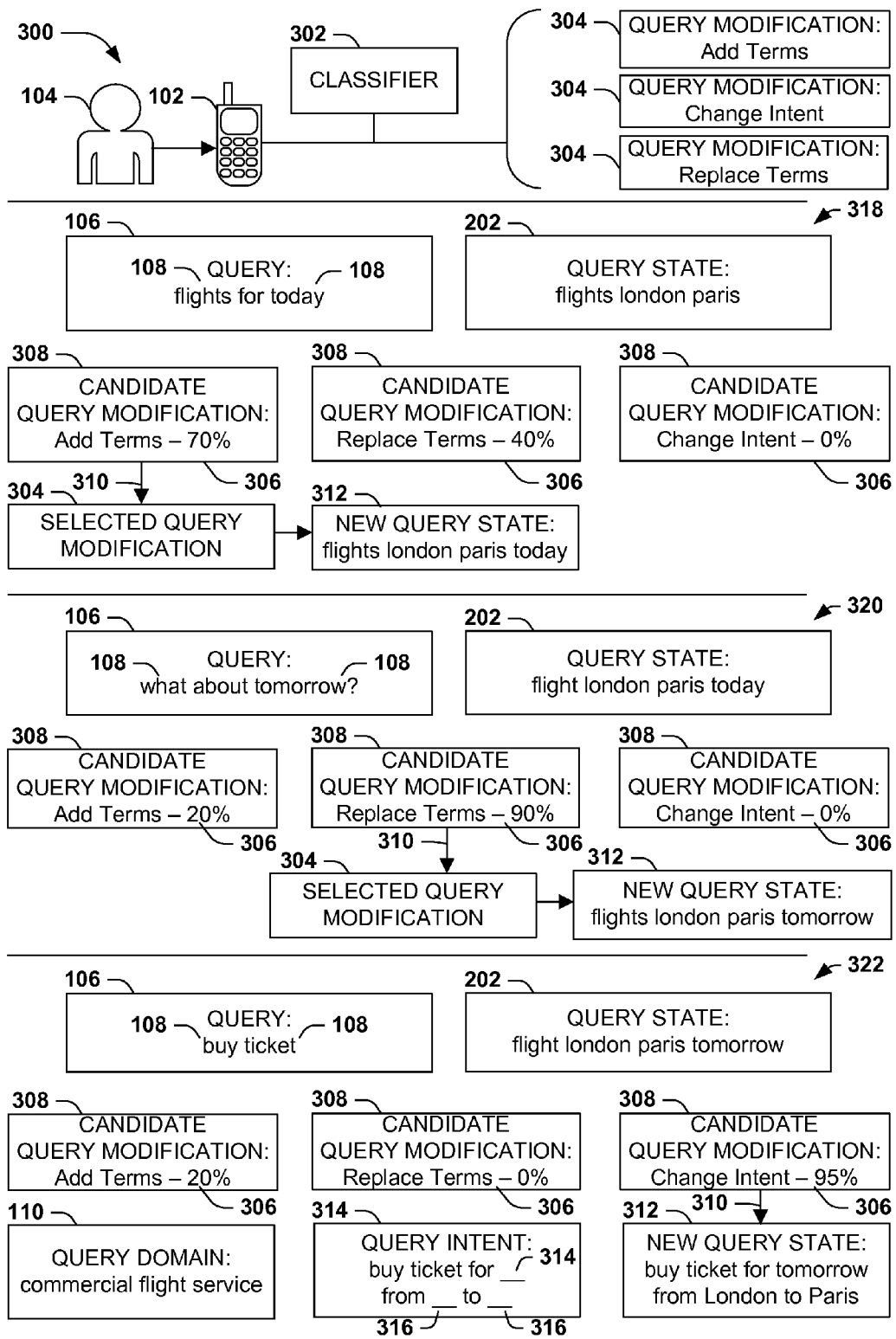
FIG. 3 is an illustration of an exemplary scenario featuring a query dialogue comprising a series of query state modifications involving a query domain in accordance with the techniques presented herein.

FIG. 3 presents an illustration of an exemplary scenario 300 featuring the parsing of queries 106 according to the techniques presented herein. In this exemplary scenario 300, a device 102 of a user 104 is equipped with a classifier 302 that is capable of classifying a query 106 as one among a set of query state modifications 304, such as a first query state modification involving adding query terms 108 to a query state 202; a second query state modification involving replacing query terms 108 in a query state 202 with new query terms 108 specified in the query 106; and a third query state modification involving changing the intent of the query state 202.

At a first time point 318, while the device 102 is already storing a query state 202 including the query terms 108 "flights london paris" (specified by the user 104 in one or more prior queries 106), the user 104 may submit a query 106 comprising the query terms 108 "flights for today". The device 102 may invoke the classifier 302 to calculate, for respective query state modifications 304, a query state modification probability 306 indicating the likelihood that the query 106 is intended to apply this type of query state modification 304 to the query state 202. Among the candidate query state modifications 306, a selection 308 may be performed to identify a selected candidate query state. The classifier 302 may determine that the first query state modification 304 has the highest query state modification probability 306 in the query state modification set, and may select 310 the selected query state modification 304 to combine the query terms 108 of the query 106 and the current query state 202, thus producing a new query state 312 "flights london paris today". The device 102 may then proceed to present query results 112 associated with this query state 202.

At a second time point 320, the user 104 may next submit the query 106 "what about tomorrow?" as a natural-language query. The classifier 302 may again be invoked to calculate query state modification probabilities 306 for respective query state modifications 304, and may select the second query state modification 304 indicating a replacement of query terms 108 as having the highest probability. The device 102 may further recognize that according to this query state modification 304, the phrase "what about tomorrow?" is intended to substitute the query term 108 "tomorrow" for a query term 108 in the query state 202 that is semantically related to the specified query term 108—in this case, the term "today," which like "tomorrow" specifies a date selection. The device 102 may compare the query state modification probabilities 306 of the candidate query states 308. In some embodiments, the candidate query states 308 may be selected as an ongoing hypothesis from the start of the dialogue with the user 104; e.g., the device 102 may recalculate the query state modification probabilities 306 for earlier stages of the dialogue based upon the query 106 submitted at the second time point 320, including recalculating the query state modification probabilities 306 of the candidate query states 308 at the first time point 318 in view of the query 106 presented at the second time point 320. Having calculated the query state modification probabilities 306 of the candidate query states 308 at the second time point 320, the device 102 may select 310 the selected query state modification 304 to achieve the substitution and arrive at the new query state 312 "flights london paris tomorrow," and, optionally, may proceed to show query results 112 for this query state 202.

At a third time point 322, the user 104 may submit a query 106 comprising the query terms 108 "buy ticket." The classifier 302 may again compute a query state modification probability 306 for each candidate query state modification 308, optionally recalculating the query state modification probabilities 306 for earlier stages of the dialogue (such as the first time point 318 and the second time point 320) based upon the information extracted from the query 106 submitted at the third time point 322. By comparing the query state modification probabilities 306 for the candidate query states 308, the device 102 may determine that the query state modification 304 involving a change of intent has the highest query state modification probability 306. In particular, the classifier 302 may recognize that within a particular query domain 110 (e.g., that of a commercial flight service), this query 106 indicates that the user 104 is specifying a query intent 314 of the query state 202 involving the purchase of a ticket for a flight. This query intent 314 may replace a former query intent 314 of the query state 202, or may provide a query intent 314 for a query state 202 that does not yet have a query intent 314 (e.g., the query state 202 may, thus far, comprise only general informational queries). As further illustrated in the exemplary scenario 300 of FIG. 3, the selected query intent 314 may specify a template query 106 that expresses the query intent 314 in the query domain 110, and that includes a series of query slots 316 to which the query terms 108 of the query state 202 may be mapped. Accordingly, the device 102 may select 310 the third query state modification 304 (and in particular, may map the query terms 108 "london," "paris," and "tomorrow" to respective query slots 316 of the query intent 314) to generate the new query state 312 "buy ticket for tomorrow from London to Paris."

The query parsing techniques presented in this exemplary scenario 300 illustrates several advantages, particularly in comparison with the query processing techniques of FIGS. 1 and 2. As a first example, by tracking the query state 202 between queries 106, the device 102 may enable the user 104 to specify a series of incremental modifications of the query 106, rather than having to modify the query manually and resubmit the entire query 106 anew (as in the exemplary scenario 100 of FIG. 1). As a second example, by considering and comparing query state modifications 304, the processing techniques of FIG. 3 enable a more conversational interaction between the user 104 and the device 102. As a third example, by utilizing a probability-based classifier 302 to determine and compare query state modification probabilities 306 rather than other techniques (such as rigidly defined keywords), the device 102 may enable such interactions through natural-language input, as in the correct evaluation of the modification requested by the query 106 at the second time point 320. As a fourth example, by inferring query domains 110 and/or query intents 314 comprising a query template with query slots 316 mapped to respective claim terms 108 of the query state 202, the device 102 may participate in the honing of the query 106 as intended by the user 104. These and other advantages may be achievable through the implementation of the query parsing techniques provided herein.

C. Exemplary Embodiments

Figure 4:
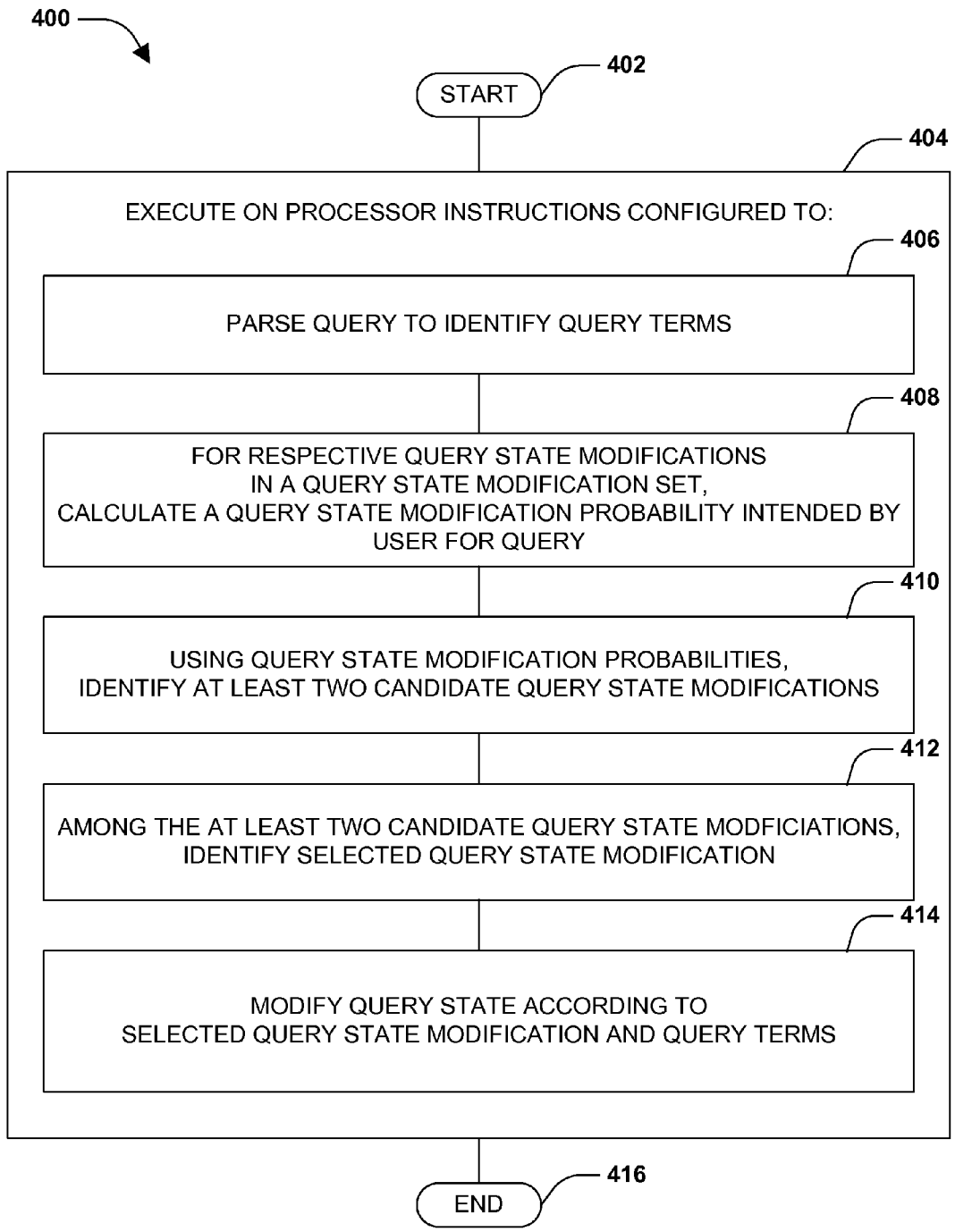
FIG. 4 is a flow chart illustrating an exemplary method of updating a query state according to a query received from a user.

FIG. 4 presents an illustration of a first exemplary embodiment of the techniques presented herein, depicted as an exemplary method 400 of updating a query state 202 according to a query 106 received from a user 104. The exemplary method 400 may be implemented, e.g., as a set of instructions stored in a memory component (e.g., a memory circuit, a platter of a hard disk drive, a solid-state storage device, or a magnetic or optical disc) of a device 102 having a processor, where such instructions, when executed on the processor of the device 102, cause the device 102 to operate according to the techniques presented herein. The exemplary method 400 begins at 402 and involves executing 404 the instructions on the processor. Specifically, the instructions are configured to parse 406 the query 304 to identify at least zero query terms 108. The instructions are also configured to, for respective query state modifications 304 in a query state modification set, calculate 408 a query state modification probability 306 intended by the user 104 for the query 106. The instructions are also configured to, using the query state modification probabilities 306, identify at least two candidate query state modifications 308. The instructions are also configured to, among the at least two candidate query state modifications 308, identify 412 a selected query state modification 304. The instructions are also configured to modify 414 the query state 202 according to the selected query state modification 304 and the query terms 108. Having modified the query state 202 according to the query state modification 304 that is likely to have been intended by the user 104 while formulating the query 106, the exemplary method 400 achieves a parsing of the query 106 according to the techniques presented herein, and so ends at 416.

Figure 5:
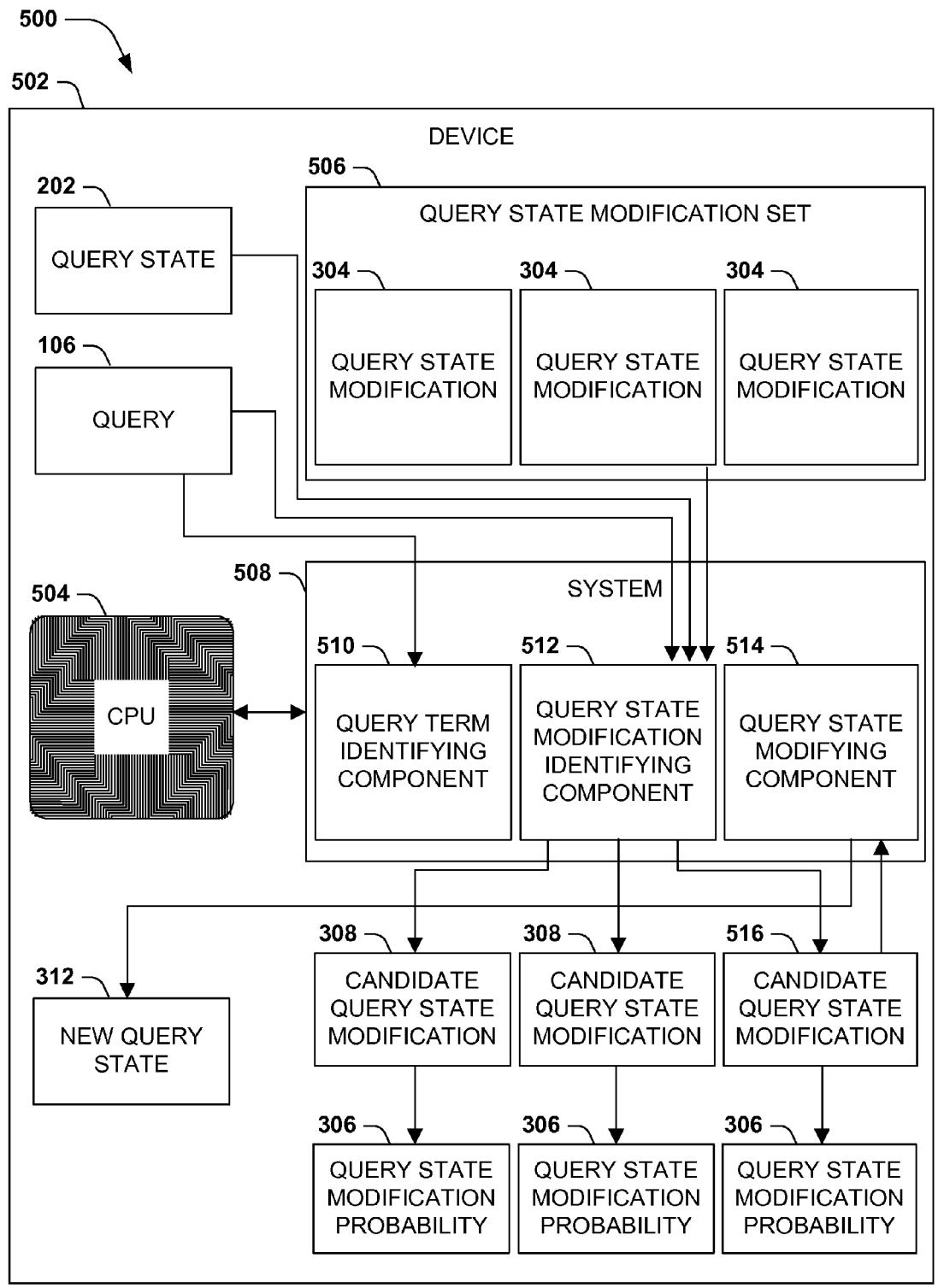
FIG. 5 is a component block diagram illustrating an exemplary system for modifying a query state using a query received from a user.

FIG. 5 presents a second exemplary embodiment of the techniques presented herein, illustrated as an exemplary system 508 for modifying a query state 202 using a query 106 received from a user 104. The exemplary system 508 may be implemented, e.g., as a set of instructions stored in a memory component (e.g., a memory circuit, a platter of a hard disk drive, a solid-state storage device, or a magnetic or optical disc) of a device 502 having a processor 504, where such instructions, when executed on the processor 504, cause the device 502 to operate according to the techniques presented herein. The exemplary system 508 comprises a query term identifying component 510, which is configured to identify query terms 108 in the query 106. The exemplary system 508 also comprises a query state modification identifying component 512, which is configured to identify at least two candidate query state modifications 308 respectively having a query state modification probability 306, and to select, from among the candidate query state modifications 308, a selected query state modification 516 having a higher query state modification probability 306 for the query 106 than other candidate query state modifications 308. The exemplary system 508 also comprises a query state modifying component 514, which is configured to modify the query state 202 according to the selected query state modification 516 and the query terms 108 of the query 106 to generate a new query state 312. The interoperation of the components of the exemplary system 508 thus achieves the generation of a new query state 312 based on the selected query state modification 516 in accordance with the techniques presented herein.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 6:
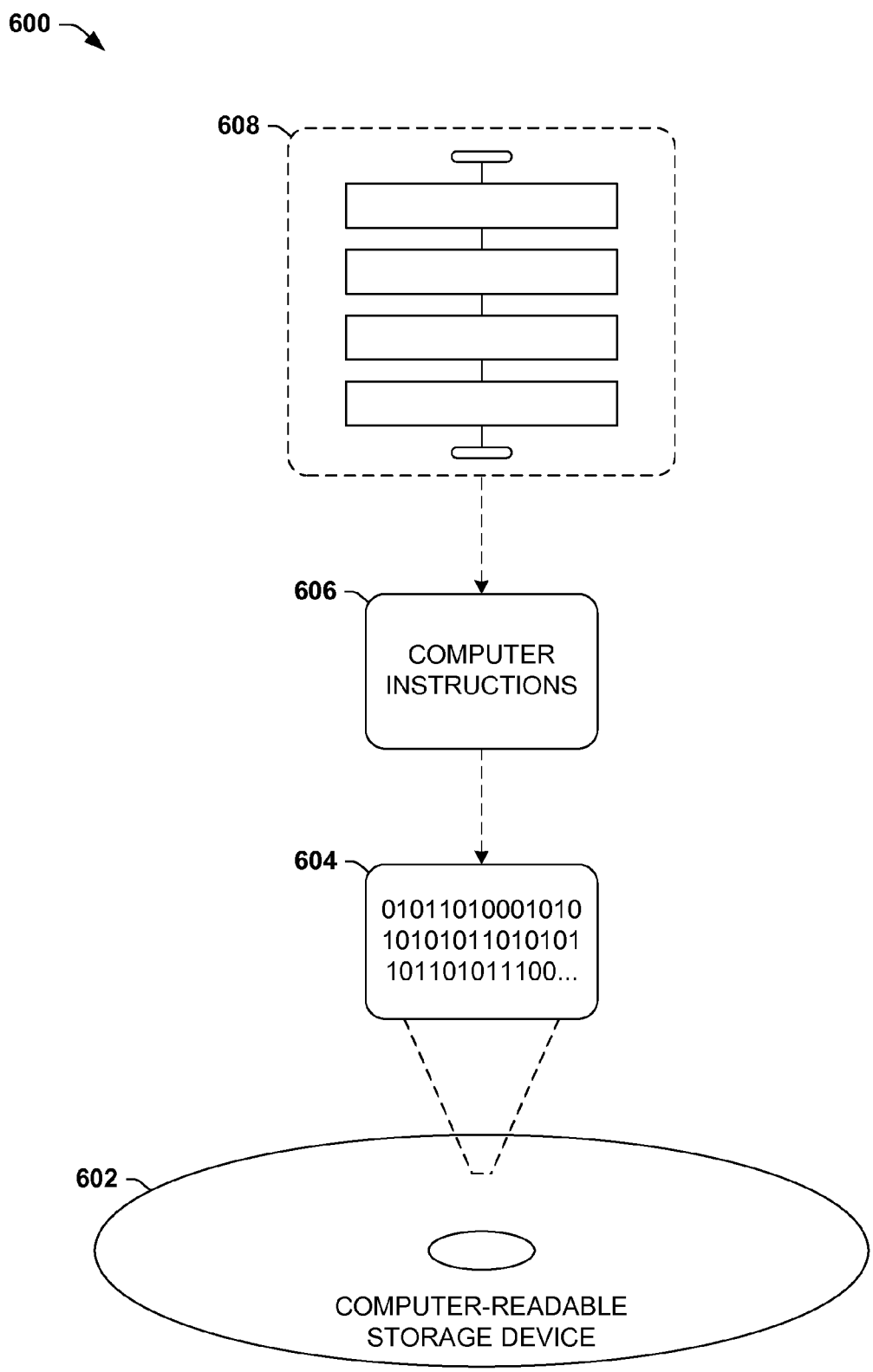
FIG. 6 is an illustration of an exemplary computer-readable medium comprising processor-executable instructions configured to embody one or more of the provisions set forth herein.

An exemplary computer-readable medium that may be devised in these ways is illustrated in FIG. 6, wherein the implementation 600 comprises a computer-readable medium 602 (e.g., a CD-R, DVD-R, or a platter of a hard disk drive), on which is encoded computer-readable data 604. This computer-readable data 604 in turn comprises a set of computer instructions 606 configured to operate according to the principles set forth herein. In one such embodiment, the processor-executable instructions 606 may be configured to perform a method of modifying a query state 202 in response to a query 106 received from a user 104, such as the exemplary method 400 of FIG. 4. In another such embodiment, the processor-executable instructions 606 may be configured to implement a system for modifying a query state 202 in response to a query 106 received from a user 104, such as the exemplary system 508 of FIG. 5. Some embodiments of this computer-readable medium may comprise a nonvolatile computer-readable storage medium (e.g., a hard disk drive, an optical disc, or a flash memory device) that is configured to store processor-executable instructions configured in this manner. As one example, the instructions may cause the device 502 to fulfill a query state 202 by selecting an initial query state 202, and upon receiving a query 106 from a user 104, calculating query state modification probabilities 306 of the query 106 for respective query state modifications 304 in the query state modification set 506; parsing the query 106 to identify at least zero query terms 108; modifying the query state 202 according to the query terms 108 and the query state modification 304 having a highest query state modification probability 306 in the query state modification set 506; and fulfilling the query 106 in view of the query state 202 (e.g., by submitting the query state 202 to a query domain 110 and presenting to the user 104 the query results 112 returned thereby). Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 400 of FIG. 4 and the exemplary system 508 of FIG. 5) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized with many types of devices 102, such as servers, server farms, workstations, laptops, tablets, mobile phones, game consoles, and network appliances.

As a second variation of this first aspect, the techniques presented herein may be utilized with many types of queries 106, such as requests for various types of information; requests to initiate various types of actions, such as Representational State Transfer (RESTful) interactions, data transformations, the invocation of functions such as web requests, and financial transactions; and interactions with various types of objects and resources. Additionally, such queries 106 may comprise many types of query terms 108 (e.g., keywords, natural-language phrases, numbers, expressions, functions, data objects, or references to physical and virtual objects, individuals, places, or concepts), where such query terms 108 may be organized in various ways (e.g., as an unordered or ordered set; according to a digital or conceptual logical flow, such as a set of Boolean logical connectors. Moreover, such queries 106 may be received through many modalities, including full-text entry, symbolic text entry (e.g., T9 input), touch or other pointer input, verbal utterances, physical gestures, and nonverbal cues such as body language and eye gaze position. In some such examples, a query 106 may be specified in two or more modalities (e.g., a combination of a verbal utterance and a physical gesture), and/or may be received in a first query modality and applied to modify a query state 202 generated by a previous query 106 received in a second query modality that is different from the first query modality.

As a third variation of this first aspect, the techniques presented herein may associate such queries 106 to various types of query domains 202. For example, the query domains 202 may comprise services, applications, data sets, and/or content sets offered by various transaction, application, data, and/or content servers, such as file servers, webservers, database servers, and email servers. Such query domains 202 may also comprise locally deployed services or components, such as a file system, database system, or email mailbox provided on the device 102. Those of ordinary skill in the art may devise many such scenarios wherein the techniques presented herein may be applied.

D2. Query Parsing

A second aspect that may vary among embodiments of these techniques relates to the manner of parsing 406 queries 106.

As a first variation of this second aspect, a query 106 may be parsed by comparing the query terms 108 with a set of known query terms 108. For example, among a set of documents (such as web pages) against which the query 106 is to be applied, respective documents may be preprocessed to identify a set of keywords associated with each document. The keywords appearing in respective documents may be considered a known set of keywords, and a query 106 may be parsed by identifying query terms 108 that match the keywords extracted from the document. Moreover, this comparison may be applied in a literal manner (e.g., finding exact matches) or a flexible manner (e.g., a string-matching comparison that attempts to identify similarities between the query terms 108 of the query 106 and the keywords of the query domain 202).

As a second variation of this second aspect, a query 106 may be adjusted in various ways during parsing. As a first example, the query terms 108 may be spell-checked in a current language in order to evaluate the query despite errors in entry. As a second example, the query 106 may be translated from a first language to a second language 106 that is more relevant to the query domain 202. As a third example, the query 106 and/or keywords of a query domain 202 may be translated according to a Soundex algorithm in order to compare query terms 108 with the spoken equivalents of the keywords.

As a third variation of this second aspect, a query 106 may be parsed according to a particular query domain 202. For example, a document set may include one or more subsets of documents sharing similar keywords (e.g., a first set of web pages comprising news articles, and a second set of web pages comprising a commercial flight service). If a particular query domain 202 has been selected, the query 106 may be parsed in view of the keywords of the current query domain 202 (e.g., interpreting the query term "oxford" as specifying the city of Oxford as a location, rather than the university located in the same city). Additionally, the semantics of a query domain 202 may be applied to parse the query 106; e.g., in the commercial flight service, the order of the query terms 108 of the query "paris to london" may indicate a semantic relationship, whereas the order may be less significant for other query domains 202, such as a generalized web search). If no query domain 202 is yet selected, the query terms 108 of the query 106 may be compared with those of respective query domains 202, and a query domain 202 having the highest similarity with the query 106 may be selected as the current query domain 202. Alternatively or additionally, the query 106 may be compared with other query domains 202, and if a different query domain 202 has a higher similarity with the query 106 than a current query domain 202, the query 106 may be interpreted as a request to switch query domains 202. These and other variations in the parsing 406 of the query 106 may be devised by those of ordinary skill in the art while implementing the techniques presented herein.

D3. Query State Modifications

A third aspect that may vary among embodiments of these techniques relates to the types of query state modifications 304 utilized by the device 102.

As a first variation of this third aspect, the query state modification set 506 may include a query state initiating modification (e.g., initializing the query state 202 at the beginning of a query dialog); a query term adding state modification (e.g., adding one or more query terms 108 to the query state 202); a query term substituting state modification (e.g., substituting one or more query terms 108 specified in the query 106 for one or more query terms 108 in the query state 202); a query term removing state modification (e.g., removing one or more query terms 108 from the query state 202); a query state saving modification (e.g., persisting the current query state 202 to enable a return to this query state 202 at a later time); a query state sequence navigating modification (e.g., returning to a former, stored query state 202); a query state domain changing modification (e.g., associating the query state 202 with a new or different query domain 110); a query state intent changing modification (e.g., associating the query state 202 with a new or different query intent 314); and a query state resetting modification (e.g., reinitializing a portion of the query state 202, such as removing all of the query terms 108 from the query state 202, resetting a history of the query state 202, and/or resetting the query domain 110 and/or the query intent 314 of the query state 202). The query state modification set 506 may therefore provide many different types of query state modifications 304 respectively representing various intents of the user 104 in formulating the query 106 to be applied to the current query state 202 of the device 102.

In view of such query state modifications 304, the device 102 may modify the query state 202 of the device 102 in various ways. As a first such example, the query state 202 may comprise a current query domain 110 selected from a query domain set, and the query state modification 304 may involve identifying a selected query domain 110 associated with the query 106, and, if the selected query domain 110 differs from the current query domain 110 of the query state 202, associating the query state 202 with the selected query domain 110. As a second such example, the query state 202 may be associated with a current query intent 314 within the query domain 110 (e.g., one of several functions or transactions that are available within a particular service), and the query state modification 304 may involve identifying a selected query intent 314 associated with the query 106, and, if the selected query intent 314 differs from the current query intent 314 of the query state 202, associating the query state 202 with the selected query intent 314. Moreover, the identification of the query domain 110 and/or query intent 314 of the query 106 may involve predictive and probabilistic classification in a similar manner as the selection of a query state modification 304. For example, the device 102 may include a query domain set by configuring a query domain classifier 302 to calculate probabilities that respective queries 106 are associated with each query domain 110. A particular query 106 may then be associated with a selected query domain 110 by invoking the query domain classifier to calculate by calculating a selected query domain probabilities of respective selected query domains 110, and, if the selected query domain probability exceeds a current query domain probability for a current query domain 110 associated with the query state 202, associating the query state 202 with the selected query domain 110.

As a second variation of this third aspect, respective query intents 314 may define a set of query slots 316 to be mapped to respective query terms 108. For example, the query intent 314 may simply identify a collection of a number and/or types of items specified in queries 106 associated with the query intent 314 (e.g., a commercial flight service may identify a query intent 316 to examine a particular flight, wherein such queries 106 may be specified as a flight number and a date). Alternatively, and as illustrated in the exemplary scenario 300 of FIG. 3, the query intent 314 may specify a template query including a number of query slots 316 into which query terms 108 of an associated query 106 may be mapped. That is, when the device 102 determines that the user 104 is seeking to submit a query 106 with a particular query intent 314, the device 102 may assist the user 104 in formulating a query 106 that accurately expresses this type of query intent 314.

As a further variation, various techniques may be utilized to map respective query terms 108 of a query 106 to the query slots 316 of a query intent 314. For example, a query intent 314 may represent a request for information about flights from an origin location to a destination location, but a query 106 contains two query terms 108 representing two locations, and logic may have to be invoked to determine which query term 108 specifies the origin location and which specifies the destination location. As a first such example, the query slots 316 may be identified with query slot identifiers (e.g., an origin location may follow the keyword "from," and a destination location may follow the keyword "to"). As a second such example, the order of the query terms 108 may be reflected in the order of the query term slots 316. Alternatively or additionally, the mapping may be probabilistically determined using a classifier configured to map query terms 108 of a query 106 to the query slots 316 of the query intent 314

As a still further variation, after selecting a query intent 314 and mapping the query state 202 and query terms 108 to respective query slots 316, the device 102 may be configured to detect one or more unfilled query slots that represent missing information for the query intent 314 (e.g., a user may specify an interest in purchasing a ticket for a flight between two cities, but may fail to specify a date). The device 102 may request a query term 108 for respective unfilled query slots (e.g., "When would you like to travel?"), and may associate provided query terms 108 with the unfilled query slots. Alternatively or additionally, the device 102 may refer to other sources of information to provide query terms 108 for unfilled query slots. For example, if a user 104 fails to specify an origin location while purchasing a flight on a particular date, the device 102 may refer to a user profile or calendar of the user 104 to predict the origin location of the user 104. Those of ordinary skill in the art may devise many types of query state modifications 304 that may be devised and/or applied according to the techniques presented herein.

D4. Calculating Query State Modification Probabilities

A fourth aspect that may vary among embodiments of these techniques relates to the manner of calculating a query state modification probability 306 indicating the likelihood that a particular query 106 is intended by the user 104 to apply a particular type of query state modification 304 to the current query state 202.

As a first variation of this fourth aspect, the device 102 may utilize a user-defined logic. For example, the user 104 or a software developer may specify the calculations for respective query state modifications 304 (e.g., a particular set of keywords or a particular natural-language phrase may indicate a particular type of query state modification 304, such as "how about <query term>" indicating a substitution of the specified query term for a query term 106 of a similar type in the query state 202).

As a second variation of this fourth aspect, a classifier 302 may be automatically generated to classify respective query terms. For example, a Bayesian classifier, an artificial neural network, or a genetic algorithm may be synthesized using a query state modification training set, comprising an identification of query state modifications 304 for prototypical queries 106.

The classifier 302 may then be invoked to classify new queries 106 specified by users 104 into query state modifications 304 with a particular query state modification probability 304 indicating how closely the query 106 matches prototypical queries in the training set. For example, the training set may include a query "how about <query term>" as a query substitution state modification, and approximately similar queries such as "so how about <query term>" and "what about <query term>" may be calculated as having a high query state modification probability 306 for query substitution state modification and a lower query state modification probability 306 for a query removal state modification specifying a removal of the specified query term 108 from the query state 202.

As a third variation of this fourth aspect, a "mechanical Turk" solution may be devised, wherein a query 106 is classified by asking the same user 104 or another user 104 to select a query state modification 304 for the query 106. This solution may be utilized, e.g., when automated or heuristic-based classifiers 302 have failed to identify a query state modification 304 having a sufficiently high query state modification probability 306, or to resolve difficult choices between two or more query state modifications 304 each having a high query state modification probability 306 for the query 106. Alternatively or additionally, the results of the user selection may be formulated as a heuristic, rule, or additional training data for training a classifier 302, thereby enabling the device 102 to calculate accurate query state modification probabilities 306 for this and similar queries 106. Those of ordinary skill in the art may devise many techniques for calculating query state modification probabilities 306 in accordance with the techniques presented herein.

D5. Candidate Query State Probabilities

A fifth aspect that may vary among embodiments of these techniques relates to the selection 310 of a selected candidate query state from among a set of candidate query state modifications 308 in view of the query state modification probabilities 306.

As a first variation of this fifth aspect, the selection 310 may be performed by many types of comparisons. As a first such example, the candidate query state modifications 308 may be compared consecutively or concurrently (e.g., identifying a set of candidate query state modifications 308 and comparing many of the query state modification probabilities 306 therefor, or identifying and selecting a first candidate query state modification 308 with a first query state modification probability 306, and then serially identifying additional candidate query state modifications 308 and performing a comparison with the currently selected query state modification).

As a second variation of this fifth aspect, the comparisons may continue until all of the query state modifications 304 stored by the device 102 are considered, and the candidate query state modification 308 having the highest query state modification probability 306 may then be selected. Alternatively, the comparisons may continue until one candidate query state modification 308 is identified as having a significantly higher query state modification probability 306 than the other candidate query state modifications 308 (e.g., continuing to evaluate the candidates until reaching a consensus that one option is considerably more likely than the others). If such a consensus is unreachable, the device 102 may ask the user 104 for a clarifying query.

As a third variation of this fifth aspect, the candidate query state modifications 308 may be compared not just for the currently submitted query 106, but for the earlier queries 106 and the candidate query state modifications 308 evaluated at the earlier stages. For example, a user 104 may submit a first query 106 asking about the cost of a trip from Paris to London, and may later submit a second query 106 asking for the distance by road from Paris to a small town outside of Burgundy that is also known as London. The second query 106 may cause the device to reevaluate the first query 106 in light of this new information, i.e., the user's expressed interest in visiting the town of London in France. Accordingly, the device 102 may reevaluate the candidate query modifications 108 and the query modification probabilities 106 for both the first query 106 and the second query 106, and may adjust the dialogue with the user 104 accordingly (e.g., updating the answers about the requested cost of the trip from Paris to London to indicate not an international flight, but a short drive). Additionally, in view of this possibility, the device 102 may, upon evaluating the candidate query modifications 108, retain the unselected candidate query modifications 304, in case future queries 106 prompt a reevaluation of the unselected candidate query modifications 308 that raises the associated query modification probabilities 306. In this manner, the device 102 may store and consider a continuing set of hypotheses indicating various possible query intents of the user 104 while formulating the queries 106; may adjust past responses, and/or may continue to consider candidate query modifications 108 as ongoing hypotheses as to the intent of the user 102. Additionally, the device 102 may also inform the user 104 when earlier presented selections 310 are adjusted upon reevaluation, and/or may spontaneously revise earlier presented information in view of the reevaluated hypotheses. These and other variations in the selection 310 of the selected query modification 304 from among the candidate query modifications 308 may be devised by those of ordinary skill in the art while implementing the techniques presented herein.

D6. Additional Features

A sixth aspect that may vary among embodiments of these techniques relates to additional features that may be included in various embodiments.

As a first variation of this sixth aspect, in addition to modifying the query state 202 in response to a query 106, an embodiment of these techniques may additionally use the query state 202 to fulfill the query 106 of the user 10. For example, an exemplary system 508 may include a query fulfilling component that is configured to evaluate the query state 202 to identify one or more query results 112, and to present the query results 112 to the user 104. Additionally, such as query fulfilling component may present the query state 202 to the user 104 with the query results 112 (e.g., describing for the user 104 the new query state 312 generated by modifying the preceding query state 202 according to the query state modification 304 specified by the query 106).

As a second variation of this sixth aspect, an embodiment of these techniques may enable the user 104 to navigate among the sequence of query states 202 comprising the query dialogue between the user 104 and the device 102. For example, an exemplary system 508 may include a query state saving component that is configured to store each new query state 312 generated by modifying the query state 202 according to a query 106, and, upon receiving a request from the user 104 to select a stored query state 202, select the stored query state 202 as the current query state 202. This navigation may be selected by an explicit command from the user 104 (e.g., "go back" or clicking "back" button) or by a query state modification 304 deduced for a query 106 (e.g., "never mind" or "none of those" in response to providing a set of query results 112). Moreover, an exemplary system 508 may store a query state hierarchy representing the hierarchical relationships between the query states 202 generated during the query dialogue, such as a stack or tree, and the user 104 may present a request to navigate from a current query state 202 to a stored query state 202 that is related to the current query state 202 in the query state hierarchy (e.g., "go back two steps" to indicate a selection of a query state 202 two steps prior in the stack in order to reverse the latest two query state modifications 304). Other hierarchical structures may also be provided to enable different types of navigation among the query hierarchy, such as a list, tree, graph, or set.

As a third variation of this sixth aspect, various techniques may be utilized to resolve ambiguities in the parsing of a query 106, including the selection of a query state modification 304, query domain 110, query intent 314, and/or a mapping of query terms 108 to respective query slots 316 of a selected query intent 314, by asking the user to clarify the query 106. For instance, if the query 202 is identifiable with two or more query state modifications 304 having similar query state modification probabilities 306, the device 102 may indicate to the user 104 a query ambiguity, and upon receiving from the user 104 a clarifying query that addresses the query ambiguity, may supplement the query 106 and/or query state 202 to generate a supplemented query, and then recalculate the query state modification probabilities using the supplemented query. As one such example, the query ambiguity may include a set of clarifying query options that address the query ambiguity toward respective query state modifications (e.g., "do you want to add these query terms to the query state, or start a new query with these query terms?"), and the clarifying query received from the user 104 may comprise a selected clarifying query option (e.g., "add terms").

As a fourth variation of this sixth aspect, a query ambiguity may be resolved through reference to outside sources. As a first such example, a user profile of the user 104 may provide information that resolves ambiguities in a query 104 and/or fills missing query terms in one or more query slots 316. As a second such example, a query state 202 may be associated with at least one earlier query 106, and the device 102 may, upon receiving a query 106 identifiable by at least two query state modifications 304, supplement the query 106 with at least one earlier query 106 to generate a supplemented query, and then recalculate the query state modification probabilities 306 of the supplemented query for respective query state modifications 304. For example, if an earlier query specified "purchase flight for today" but later queries 106 and/or query states 202 omit a specified date, a query slot 316 representing a date for purchasing a flight ticket may be inferred from the earlier query as "today." These and other features may be included in various embodiments of the techniques presented herein.

Figure 7:
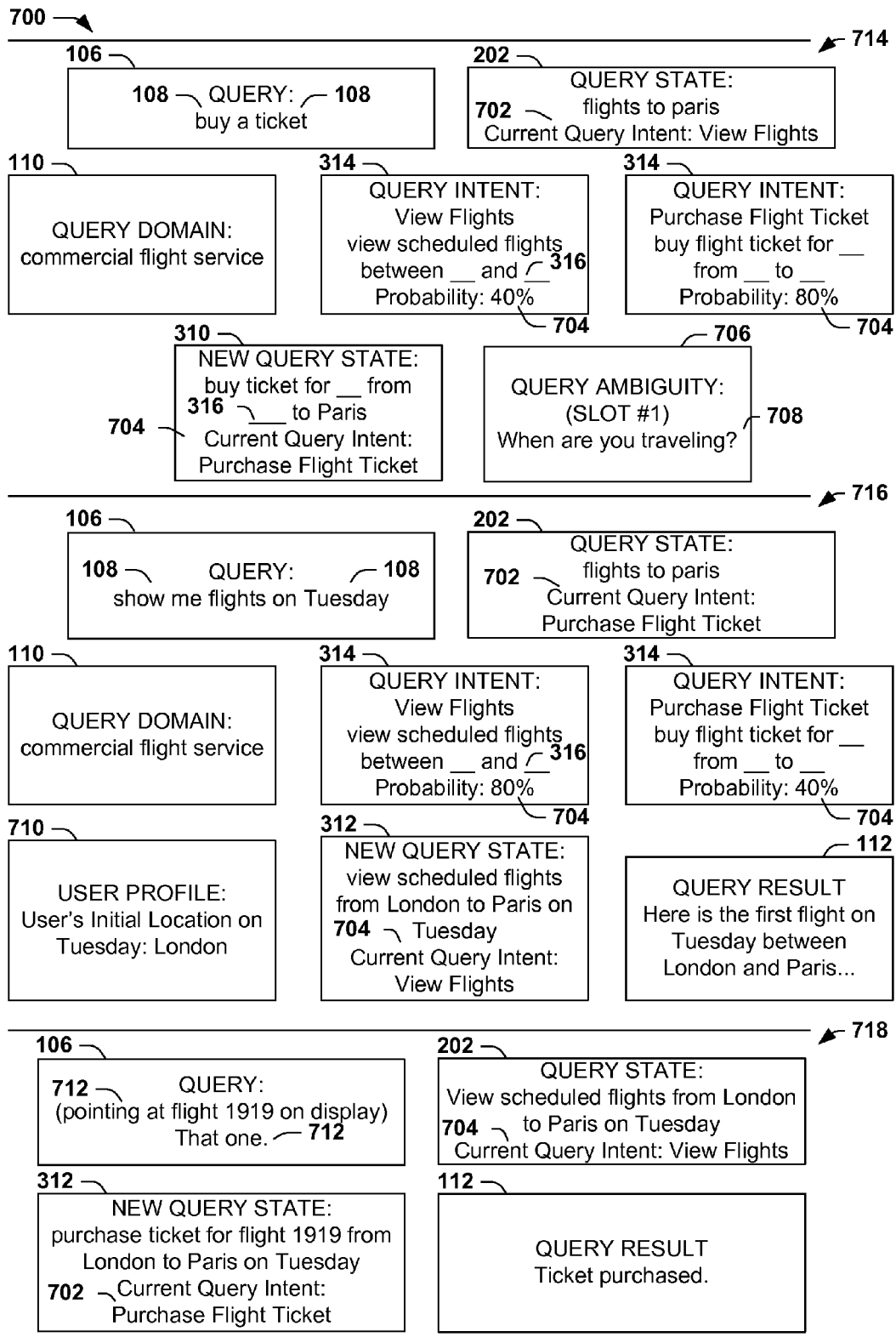
FIG. 7 is an illustration of an exemplary scenario featuring another query dialogue comprising a series of query state modifications involving a query domain in accordance with the techniques presented herein.

FIG. 7 presents an illustration of an exemplary scenario 700 featuring several of these variations. In this exemplary scenario 700, at a first time point 714, a device 102 may have previously inferred the query domain 110 of a commercial flight service, and may identify two types of query intents 314 within this query domain 110: "View Flights" and "Purchase Flight Ticket" (indicating frequent actions that users 104 perform through the commercial flight service). Additionally, the device 102 may have selected a current query state 202 featuring the query terms 108 "flights to paris," and an association with a current query intent 702 "View Flights," indicating that the user 104 has heretofore been submitting queries 106 related to seeking information about available flights from unspecified origin locations to the city of Paris. However, at this time point 714, a query 106 involving query terms 108 "buy a ticket" may be submitted by the user 104. Using a classifier 304 or other technique, the device 102 may compute query intent probabilities 704 relating the query 106 and the query state 202 to the query intents 314, and by comparing the query intent probabilities 704, may infer that the user 104 is requesting a transition from the current query intent 702 of "View Flights" to a different query intent 314 "Purchase Flight Ticket." The device 102 may therefore select a new query state 312 selecting a new query intent 704 within the query domain 110. Additionally, the device 102 may endeavor to map the query terms 106 of the query state 202 and the query 108 to the query slots 316 of the new query state 312, and may identify at least one unfilled query slot, i.e., the date of travel. This unfilled query slot may represent a query ambiguity 706 that may be presented to the user (as a clarifying query request 708) in order to prompt the provision of additional information that may facilitate the fulfillment of the query.

At a second time point 716, the user 104 may provide a second query 106 as a clarifying query responsive the query ambiguity 708. However, the second query may also represent another change in query intent 314, e.g., returning to the query intent 314 of viewing available flights rather than purchasing tickets. Upon making this determination (by comparing the query intent probabilities 704 computed for respective query intents 314), the device 102 may store the query state 202 relating to purchasing tickets, and may generate a new query state 312 based on the query terms 108 of the query 106 (in particular, the query term "Tuesday" for the date of the flight) and the query state 202. However, the query slots 316 of this query intent 314 may include an unfilled query slot indicating the origin location for the flight. However, at this second time point 716, rather than asking the user 104 for a clarifying query, the device 102 may refer to a user profile 710 of the user 104 to determine where the user 104 is likely to be on Tuesday, and may discern the user's initial location of London. The device 102 may therefore supplement the new query state 312 with this information, may evaluate the new query state 312 in the selected query domain 110 of a commercial flight service, and may present the query results 112 to the user 104 in the form of a list of flights from London to Paris on Tuesday.

At a third time point 718, the user 104 may submit a third query 106 as a combination of a gesture 712 (e.g., pointing at an entry in the list of query results 112) and providing the natural-language input 712 "that one." This multi-modality query 106 may be evaluated with the query state 202. However, the current query state 202 and current query 106 may together be inadequate to support a deduction of the query intent 314 (e.g., the query intent probabilities 704 for all query intents 314 may be low). Instead, the query state 202 may be supplemented with information about the earlier, stored query state 202 indicating the user's intent to purchase a flight, which may significantly raise the query intent probability 704 of this query intent 314. Accordingly, the device 102 may infer that the user's selection indicates a request to purchase a ticket for the selected flight. Moreover, in view of the completely filled set of query slots 316 of this query intent 314, the device 102 may evaluate the new query state 312 in the selected query domain 110, thereby completing the purchase of the selected flight ticket and presenting a confirmation as the query result 112. In this manner, the exemplary scenario 700 of FIG. 7 depicts the incorporation of many of the variations presented herein in the fulfillment of a query dialogue between the user 104 and the device 102. Those of ordinary skill in the art may devise many such features usable in many such scenarios in accordance with the techniques presented herein.

E. Computing Environment

Figure 8:
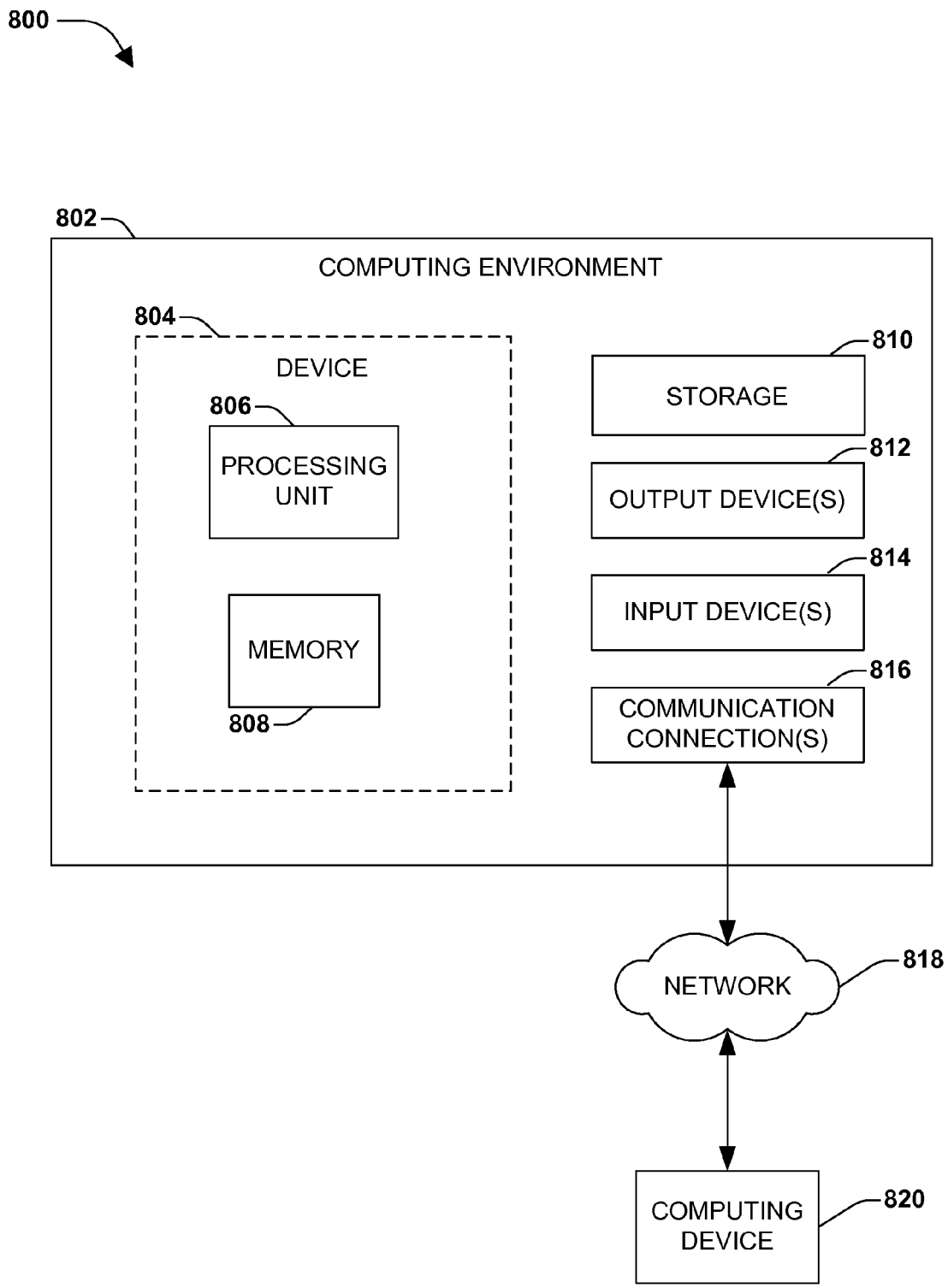
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 802 configured to implement one or more embodiments provided herein. In one configuration, computing device 802 includes at least one processing unit 806 and memory 808. Depending on the exact configuration and type of computing device, memory 808 may be volatile (such as RAM, for example), non-volatile (such as ROM, flash memory, etc., for example) or some combination of the two. This configuration is illustrated in FIG. 8 by dashed line 804.

In other embodiments, device 802 may include additional features and/or functionality. For example, device 802 may also include additional storage (e.g., removable and/or non-removable) including, but not limited to, magnetic storage, optical storage, and the like. Such additional storage is illustrated in FIG. 8 by storage 810. In one embodiment, computer readable instructions to implement one or more embodiments provided herein may be in storage 810. Storage 810 may also store other computer readable instructions to implement an operating system, an application program, and the like. Computer readable instructions may be loaded in memory 808 for execution by processing unit 806, for example.

The term "computer readable media" as used herein includes computer storage media. Computer storage media includes volatile and nonvolatile, removable and non-removable media implemented in any method or technology for storage of information such as computer readable instructions or other data. Memory 808 and storage 810 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 802. Any such computer storage media may be part of device 802.

Device 802 may also include communication connection(s) 816 that allows device 802 to communicate with other devices. Communication connection(s) 816 may include, but is not limited to, a modem, a Network Interface Card (NIC), an integrated network interface, a radio frequency transmitter/receiver, an infrared port, a USB connection, or other interfaces for connecting computing device 802 to other computing devices. Communication connection(s) 816 may include a wired connection or a wireless connection. Communication connection(s) 816 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 802 may include input device(s) 814 such as keyboard, mouse, pen, voice input device, touch input device, infrared cameras, video input devices, and/or any other input device. Output device(s) 812 such as one or more displays, speakers, printers, and/or any other output device may also be included in device 802. Input device(s) 814 and output device(s) 812 may be connected to device 802 via a wired connection, wireless connection, or any combination thereof. In one embodiment, an input device or an output device from another computing device may be used as input device(s) 814 or output device(s) 812 for computing device 802.

Components of computing device 802 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 802 may be interconnected by a network. For example, memory 808 may be comprised of multiple physical memory units located in different physical locations interconnected by a network.

Those skilled in the art will realize that storage devices utilized to store computer readable instructions may be distributed across a network. For example, a computing device 820 accessible via network 818 may store computer readable instructions to implement one or more embodiments provided herein. Computing device 802 may access computing device 820 and download a part or all of the computer readable instructions for execution. Alternatively, computing device 802 may download pieces of the computer readable instructions, as needed, or some instructions may be executed at computing device 802 and some at computing device 820.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of updating a query state according to a query received from a user of a device having a processor, the method comprising:

executing on the processor instructions configured to:

receive a query;

generate a query state based on the received query;

receive a follow-up query;

parse the follow-up query to identify at least zero query terms;

for each query state modification in a query state modification set, calculate a query state modification probability intended by the user for the follow-up query;

using the query state modification probabilities, identify at least two candidate query state modifications for modifying the query state;

among the at least two candidate query state modifications, identify a selected query state modification having a highest associated query state modification probability;

modify the query state according to the selected query state modification;

combine the follow-up query with the modified query state to create a modified follow-up query; and provide search results based on the modified follow-up query.

2. The method of claim 1, wherein:

the query state comprises a current query domain selected from a query domain set; and modifying the query state comprises:

identifying a selected query domain associated with the query; and if the selected query domain associated with the query differs from the current query domain of the query state, associating the query state with the selected query domain.

3. The method of claim 2, wherein associating the query state with the selected query domain comprises:

calculating a selected query domain probability of the selected query domain associated with the query;

calculating a current query domain probability of the current query domain associated with the query state; and if the selected query domain probability exceeds the current query domain probability, associating the query state with the selected query domain.

4. The method of claim 2, wherein:
the query state associated is with a current query intent within the query domain; and
modifying the query state comprises:
  identifying a selected query intent associated with the query; and
  if the selected query intent associated with the query differs from the current query intent of the query state, associating the query state with the selected query intent.

5. The method of claim 4, wherein:
respective query domains are associated with at least one query intent; and
identifying the selected query intent comprises: identifying a selected query intent associated with the query from the query intents associated with the selected query domain.

6. The method of claim 5, wherein:
respective query intents comprise at least one query slot; and
modifying the query state comprises: associating respective query slots of the selected query intent with at least one query term.

7. The method of claim 6, wherein:
respective query slots are associated with a query slot identifier; and
modifying the query state comprises associating respective query slots with a query term according to the query slot identifier of the query slot.

8. The method of claim 6, wherein the instructions are further configured to:
upon identifying at least one unfilled query slot, request a query term for respective unfilled query slots; and
upon receiving from the user a query term for an unfilled query slot, associate the query term with the unfilled query slot.

9. A system for modifying a query state using a query received from a user of a device having a processor, the system comprising:
a query term identifying component configured to identify query terms in the query and in a follow-up query;
a query state modification identifying component configured to:
  identify a query state modification set comprising at least two candidate query state modifications respectively having a query state modification probability, and
  from the query state modification set, identify a selected query state modification having a higher query state modification probability for the follow-up query than the query state modifications of other candidate query state modifications; and
a query state modifying component configured to modify the query state according to the selected query state modification and the query terms identified in the follow-up query.

10. The system of claim 9, wherein:
the system further comprises a query state modification training set;
the query state modification identifying component comprises a classifier;
the query state modification identifying component is further configured to train the classifier using the query state modification training set; and
selecting the query state modification set comprises: after training the classifier, classifying respective queries into a query state modification selected from the query state modification set.

11. The system of claim 9, further comprising: a query state saving component configured to:
upon the query state modifying component modifying the query state to generate a current query state, store the current query state; and
upon receiving a request to select a stored query state, select the stored query state as the current query state.

12. The system of claim 11, wherein:
the query state saving component comprises a query state hierarchy; and
receiving the request comprises: receiving a request to navigate from a current query state to a stored query state that is related to the current query state in the query state hierarchy.

13. The system of claim 9, further comprising: a query fulfilling component configured to:
evaluate the query state to identify a query result; and
present the query result to the user.

14. The system of claim 13, wherein the query fulfilling component is further configured to present the query state to the user with the query result.

15. A system comprising:
at least one processor; and
a memory storing instructions that, when executed by the at least one processor perform the following actions:
receive an initial query from a user;
generate an initial query state based on the initial query;
receive a follow-up query from a user; and
upon receiving the follow-up query:
  parse the follow-up query to identify at least zero follow-up query terms;
  calculate query state modification probabilities of the follow-up query for at least two candidate query state modifications in the query state modification set;
  modify the query state according to the follow-up query terms and the query state modification having a highest query state modification probability among the candidate query state modifications; and
  fulfill the query in view of the query state.

16. The system of claim 15, wherein the query state modification set comprises:
a query state initiating modification;
a query term adding state modification;
a query term substituting state modification;
a query term removing state modification;
a query state saving modification;
a query state sequence navigating modification;
a query state domain changing modification;
a query state intent changing modification; and
a query state resetting modification.

17. The system of claim 15, wherein:
the initial query is received in a first query modality; and
the follow-up query received after the previous query and in a second query modality that is different from the first query modality.

18. The system of claim 15:
the query state associated with at least one earlier query; and
the instructions further configured to, upon receiving a query identifiable by at least two query state modifications:
  supplement the query with at least one earlier query to generate a supplemented query; and recalculate the query state modification probabilities of the supplemented query for respective query state modifications in the query state modification set.

19. The system of claim 15, wherein the instructions are further configured to:
- indicate to the user a query ambiguity of the follow-up query; and
- upon receiving from the user a clarifying query addressing the query ambiguity:
  - supplement the follow-up query with the clarifying query to generate a supplemented query; and
  - recalculate the query state modification probabilities of the supplemented query for respective query state modifications in the query state modification set.

20. The system of claim 19, wherein:
- indicating the query ambiguity to the user comprises: for query state modifications identifiable for the follow-up query, presenting to the user a clarifying query option addressing the query ambiguity toward the respective query state modification; and
- receiving the clarifying query comprises: receiving from the user a selected clarifying query option.

\* \* \* \* \*